(12) United States Patent
White

(10) Patent No.: US 6,568,306 B2
(45) Date of Patent: May 27, 2003

(54) APERTURE PUNCHING UNIT

(76) Inventor: John William White, 16 Truman Road, Barrie, Ontario (CA), L4M 6E7

( * ) Notice: Subject to any disclaimer, the term of this patent is extended or adjusted under 35 U.S.C. 154(b) by 0 days.

(21) Appl. No.: 09/892,473

(22) Filed: Jun. 28, 2001

(65) Prior Publication Data

US 2002/0000147 A1 Jan. 3, 2002

Related U.S. Application Data

(60) Provisional application No. 60/215,078, filed on Jun. 30, 2000.

(30) Foreign Application Priority Data

Jun. 29, 2000 (CA) .............................................. 2312693

(51) Int. Cl.⁷ ................................................. B26F 1/14
(52) U.S. Cl. ............................... 83/188; 83/54; 83/954; 83/192; 83/916
(58) Field of Search .......................... 83/184, 188, 181, 83/191, 179, 124, 125, 54, 954, 192, 193, 549, 551, 559, 571, 684, 685, 686, 687, 691, 698.91, 916, 917

(56) References Cited

U.S. PATENT DOCUMENTS

| | | | | |
|---|---|---|---|---|
| 877,855 A | * | 1/1908 | Murray | .......................... 83/184 |
| 1,305,972 A | * | 6/1919 | Pearne | .................... 29/243.55 |
| 2,829,983 A | * | 4/1958 | De Gain | ....................... 83/181 |
| 3,231,099 A | * | 1/1966 | Kidd | ............................. 414/20 |
| 3,288,010 A | * | 11/1966 | Rutz | ............................. 83/191 |
| 3,698,274 A | * | 10/1972 | Coulon et al. | ................. 83/188 |
| 3,701,352 A | * | 10/1972 | Bosworth | .................... 83/191 |
| 3,848,497 A | | 11/1974 | Lancaster et al. | |
| 3,981,214 A | * | 9/1976 | Wich | ............................ 83/414 |
| 4,086,837 A | * | 5/1978 | Dyck | ....................... 83/698.71 |
| 4,373,414 A | * | 2/1983 | Agius | ........................... 83/414 |
| 4,426,899 A | | 1/1984 | Long et al. | |
| 4,487,566 A | * | 12/1984 | Barna | .......................... 425/193 |
| 4,555,966 A | * | 12/1985 | Klingel | ....................... 83/76.1 |
| 4,569,267 A | * | 2/1986 | Klingel | ......................... 83/552 |
| 4,610,185 A | * | 9/1986 | France | ............................ 76/29 |
| 4,662,256 A | * | 5/1987 | Hicks | ........................... 83/124 |
| 4,718,161 A | * | 1/1988 | Pfister et al. | .................. 483/28 |
| 4,744,276 A | | 5/1988 | Duce | |
| 4,750,393 A | | 6/1988 | Yamagata | |
| 4,947,716 A | * | 8/1990 | Whistler | ......................... 83/98 |
| 5,114,394 A | | 5/1992 | Madsen | ...................... 493/227 |
| 5,307,715 A | * | 5/1994 | Smock | ......................... 83/386 |
| 5,553,525 A | * | 9/1996 | Mailey et al. | .................. 83/184 |
| 5,601,006 A | * | 2/1997 | Quinn et al. | ................... 83/588 |
| 5,685,212 A | * | 11/1997 | Licata et al. | .................. 83/277 |
| 5,974,929 A | * | 11/1999 | Kugel et al. | ................... 83/582 |
| 6,128,991 A | * | 10/2000 | Nakagawa et al. | ........... 83/178 |
| 6,145,425 A | * | 11/2000 | Bonnar et al. | ........... 83/522.15 |

* cited by examiner

*Primary Examiner*—Paul T. Sewell
*Assistant Examiner*—Nini Legesse
(74) *Attorney, Agent, or Firm*—Santosh K. Chari; McCarthy Tétrult LLP.

(57) ABSTRACT

A punching unit for punching holes of a selected geometry in a wall of a component. The punching unit has a frame for supporting the component and the tool and die assembly releaseably securable to the frame. Tool and die assembly has a punch operatively coupled to a mandrel and a male die member and a female die member cooperating to form the hole in the wall. A portion of the tool and die assembly is interchangeable to provide a selected one of a plurality of predetermined hole geometries for the component.

19 Claims, 3 Drawing Sheets

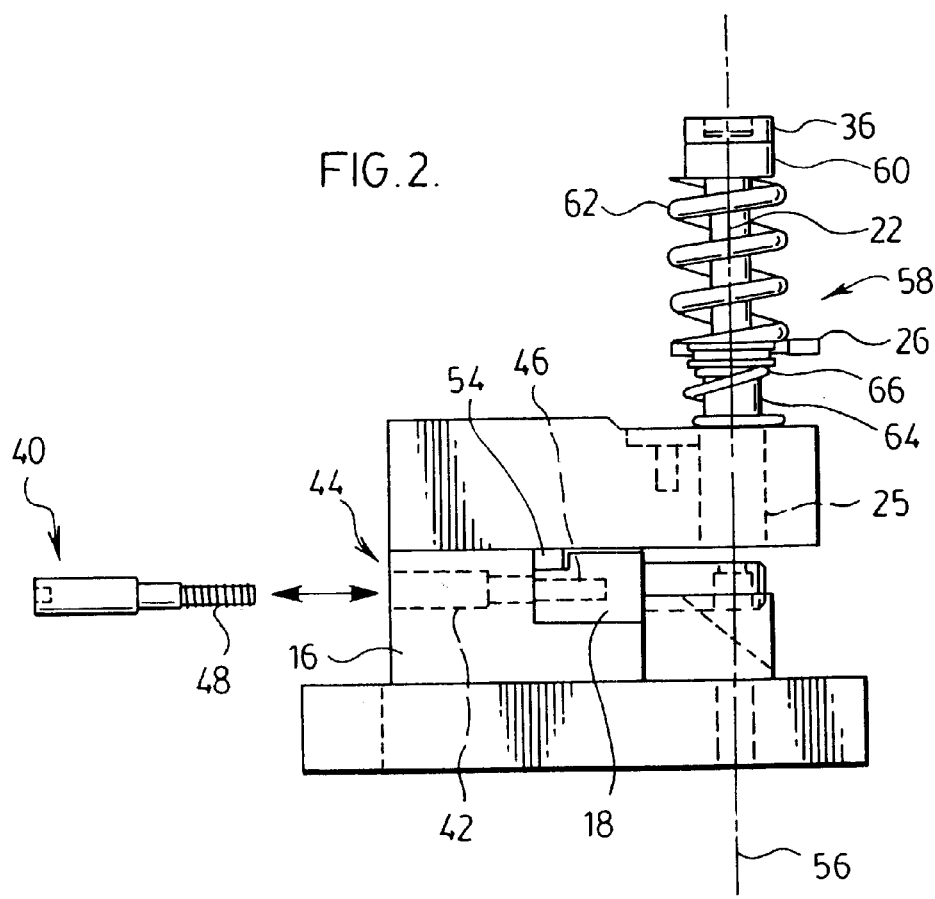
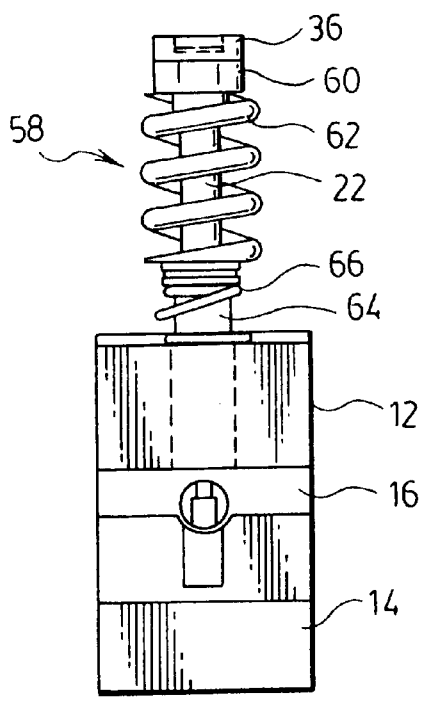

APERTURE PUNCHING UNIT

CROSS REFERENCE TO RELATED APPLICATIONS

This application claims the benefit of Provisional Application 60/215,073 filed Jun. 30, 2000.

FIELD OF THE INVENTION

The present invention relates to an apparatus for producing punched apertures in a wall of a component.

BACKGROUND OF THE INVENTION

Punching a hole in an exterior wall of a tubular member is practiced in many areas of industry. The location and size of the holes facilitate access either through or into the interior of the tubular member, at positions other than the ends of the tube. The punching of holes through sheet metal portions also facilitate access from one side of the sheet to the other. Commercially available punching units are used to manufacture these holes, due to their repeatability of position and orientation of the holes. Drills are another device that can be used to create these holes, but the drills can create complications due to a formation of burrs at an edge of the hole, a formation of chips, and a potential need for a lubricant. In addition, the drills are typically slower for hole formation than the punching units, which also have an added benefit of being able to produce hole shapes other than circular.

One example of a punching unit is taught by U.S. Pat. No. 3,848,497. This patent teaches a mandrel attached to a frame, by means of a fastener in the interior of the unit. A tube to be punched is slid over the mandrel, above which lies a punch. The punch includes a female die member and the mandrel includes a male die member. One disadvantage of this unit is that setup time for the female and male die members can be lengthy, due to the number of fasteners and adjustments used to assemble the unit. Accordingly, the punching unit of the '497 patent is not readily adaptable to produce a variety of different sized or shaped holes, without incurring substantial down-time to change the members that correspond to a desired hole geometry. Therefore, it is common for a manufacturer to have a series of punching units, one for each hole geometry to be produced. This arrangement can reduce down-time, but requires the manufacturer to purchase multiple punching units.

Another punching unit is taught by U.S. Pat. No. 4,744,276, which discloses a punch assembly for producing a series of holes along a length of the tubular member. The tubular member is fed progressively over the mandrel, so that a punch head can be operated cyclically in order to punch a series of holes in the tube. Unfortunately, the punching unit of the '276 patent also suffers from the same adaptability problem as the '497 patent. Furthermore, the mandrel of the '276 patent is replaced as a single unit when it is worn out, which is undesirable. Mandrels are typically precision made to close tolerances and can be expensive to replace.

It is in object of the present invention to obviate or mitigate some of the above presented disadvantages by providing an adaptable punching unit.

SUMMARY OF THE INVENTION

According to the present invention there is provided an apparatus for punching an aperture of selected geometry in a wall of a component. The apparatus comprises a frame for supporting the component and a tool and die assembly releaseably securable to the frame. The tool and die assembly has a punch operatively coupled to a mandrel and comprises a male die member and female die member cooperating to form the aperture in the wall. One of the members is coupled to the mandrel and the other of the members is coupled to the punch. The mandrel is releasably securable to a portion of the frame and the punch is releasably securable to another portion of the frame. The longitudinal axis of the mandrel is placed in a fixed position relative to the longitudinal axis of the punch once each of the mandrel and the punch is secured to the frame. The male and female portions of the tool and die assembly arc interchangeable as a sot and aligned in a fixed position to one another once said mandrel and said punch are secured. The male and female portions cooperate to provide a selected one of a plurality of predetermined aperture geometries in the wall.

BRIEF DESCRIPTION OF THE DRAWINGS

These and other features of the preferred embodiments of the invention will now be described by way of example only with reference to the accompanying drawings, in which:

FIG. 2 is a side view of an assembled tube punching unit of FIG. 1;

FIG. 3 is an end view of the unit of FIG. 1;

DESCRIPTION OF THE PREFERRED EMBODIMENTS

Figure 1:
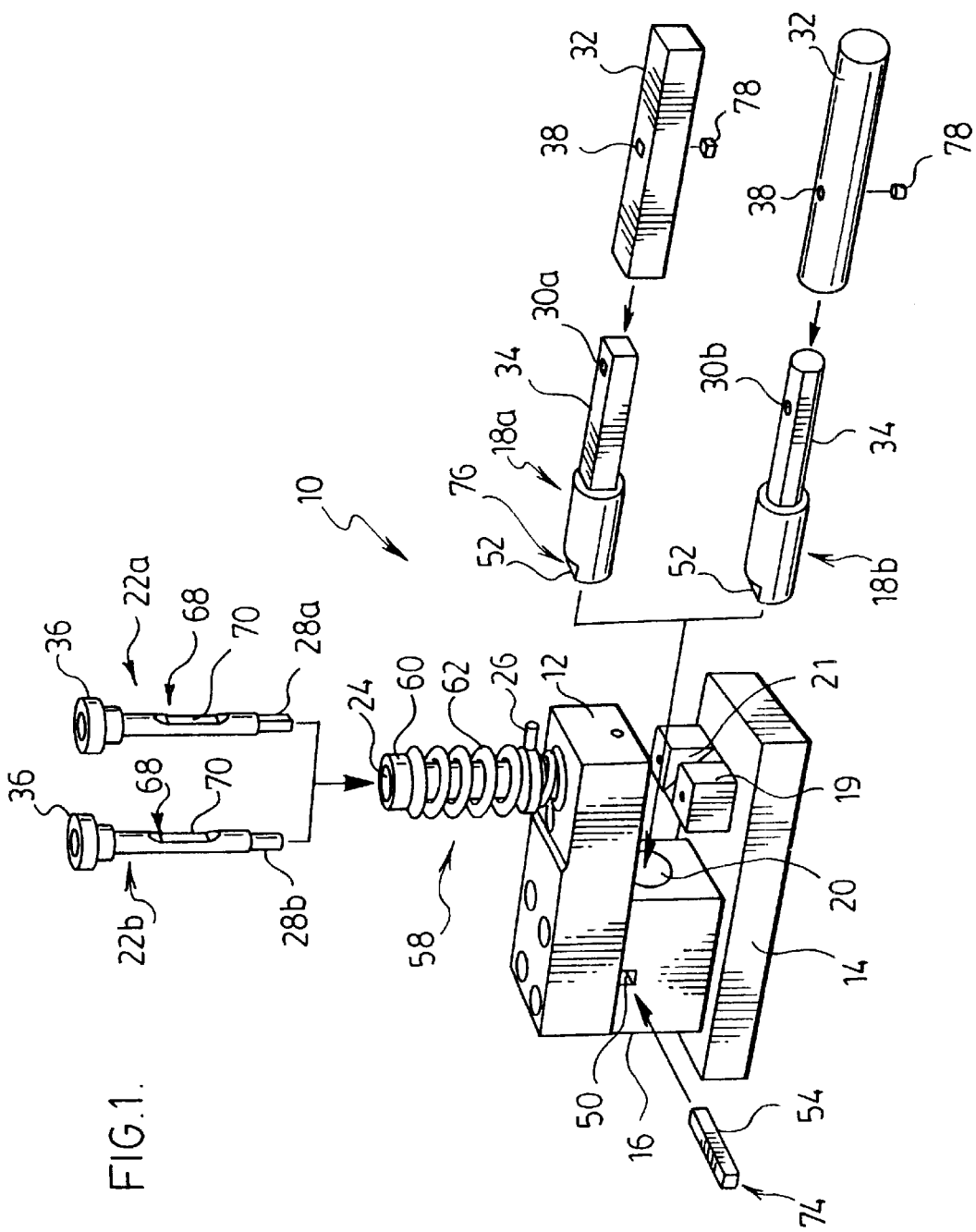
FIG. 1 is a perspective exploded view of a tube punching unit.

Referring to FIG. 1, a punching unit 10 consists of a punch support 12 connected to a base 14. Situated between the base 14 is a mandrel support 16. A tool and die assembly 17 consists of a mandrel 18a,b and a punch 22a,b. The mandrel 18a,b is received by a mandrel bore 20 of the support 16 and secured therein. The punch 22a,b is received by a punch bore 24 in a guide assembly 58 and a bore 25 in the support 12, and is retained therein by a punch retaining pin 26. Once assembled, as shown in FIG. 2, a male die member 28a or 28b, located on the punch 22a,b, is aligned vertically with a corresponding female die member 30a or 30b, located in the mandrel 18a,b. A tubular member 32 is then positioned on a correspondingly dimensioned shaft 34 of the mandrel 18a,b. A punch head 36 is then displaced along a vertical axis 56, either manually or by means of an actuator (not shown), causing the male die member 28a,b to pass through an exterior wall of the tube 32 and enter the corresponding female die member 30a,b, thereby producing a hole or aperture 38 in the member 32. A support block 19 provides support for potential bending stresses placed on the mandrel 18a,b as the punch 22a,b impacts the member 32. The member 32 is positioned in a channel 21 and rests on the block 19, as the member 32 is positioned on the mandrel 18a,b.

As can be seen in FIGS. 1 and 2, the mandrel 18a,b is retained in the bore 20 by a retaining screw 40. The screw 40 is received by bore 42, located on a rear face 44 of the mandrel support 16. The mandrel 18 has a threaded bore 46 that is alignable with the bore 42. The retaining screw 40 has a corresponding male threaded member 48, which is threaded into the threaded bore 46 to fasten the mandrel 18 to the mandrel support 16. A key-way 50 passing through the mandrel support 16 is aligned with a cutout 52 in the mandrel 18, when the mandrel 18 is received by the bore 20. A key 54 is received by the key-way 50 and along the aligned cutout 52, thereby facilitating alignment of the female die member 30*a,b* along the vertical axis 56 of the punch 22.

The punch 22*a,b* is received by the bores 24, 25 and retained therein by a punch retaining pin 26, located on the guide assembly 58. The guide assembly 58 consists of a guide head 60, a stripping spring 62, a guide portion 64, and a lifter spring 66. The guide assembly 58 permits the punch 22*a,b* to be displaced in a reciprocal fashion along the axis 56. The springs 62 and 66 bias the male die member 28*a,b* upwardly away from the female die member 30*a,b*. The guide portion 64 inhibits the punch 22*a,b* from deviating away from the vertical axis 56 during operation of the punch unit 10.

The punch 22*a,b* has an elongated cutout 68. A distal end (not shown) of the retaining pin 26 is engaged towards the cutout 68 and is situated adjacent to a flat portion 70 of the cutout 68, as the punch 22*a,b* reciprocates along the axis 56. The distal end of the pin 26 may contact the portion 70, if desired. The function of the retaining pin 26 and cutout 68 arrangement is to facilitate displacement of the punch 22*a,b* in the bores 24, 25, while at the same time inhibiting accidental removal of the punch 22*a,b* from the bores 24, 25 when the pin 26 is engaged.

In operation of the punch unit 10 the appropriate mandrel 18*a* or 18*b* is selected (with the corresponding female die member 30*a,b*) and is received by the bore 20. The angular orientation of the mandrel 18*a,b* is adjusted until the cutout 52 is aligned with the key-way 50. The key 54 is then inserted into the key-way 50 so that a bottom surface 74 of the key 54 rests against a corresponding top surface 76 of the cut-out 52, thereby fixing the angular orientation of the mandrel 18*a,b* in the bore 20. This arrangement helps to align the female die member 30*a,b* along the vertical axis 56. The retaining screw 40 is then received by the bore 42, and the male threaded member 48 is screwed into the corresponding threaded bore 46 of the mandrel 18*a,b*, thereby securely fastening the mandrel 18*a,b* to the mandrel support 16.

The punch retaining pin 26 is then retracted out of the bore 24, in order to allow the punch 22*a,b* to be inserted therein until the punch head 36 contacts the guide head 60. The face 70 is aligned parallel with the distal end of the pin 26 and then the pin 26 is engaged towards the punch 22*a,b*, thereby retaining the punch 22*a,b* in the bores 24, 25. A correspondingly sized tubular member 32 is positioned on the shaft 34 of the mandrel 18*a,b* and held in position (either manually or with the aid of clamps), as the punch head 36 is displaced with sufficient force towards the punch support 12. This displacement causes the male die member 28*a,b* to be driven through the exterior wall of the tubular member 32 and into the female die member 30*a,b*, thereby cutting out a portion 78 of the wall to produce the hole 38. It should be noted that a passageway 72 can be situated in the base 14 along the axis 56. The passageway 72 can receive the blanks 78 as they are cut out of the tubular member 32 by the punch 22*a,b*, thereby facilitating their removal from the punch unit 10.

When an operator of the punch unit 10 wishes to produce a hole of different geometry, the retaining pin 26 is retracted from the bore 24 and the punch 22*a,b* is removed therefrom. A different punch 22*a,b* is selected, inserted into the bores 24, 25, and the pin 26 is engaged towards the punch 22*a,b*. In regards to the mandrel 18*a,b*, the retaining screw 40 is removed from the bore 42 and the key 54 is removed from the key-way 50, thereby permitting the mandrel 18*a,b* to be removed from the bore 20. At this stage, an appropriate mandrel 18*a,b* corresponding to the selected punch 22*a,b* is received by the bore 20 and secured therein by the retaining screw 40 and key 54. The punch unit 10 is now ready for use by the operator to produce holes 38 with the selected hole geometry, as described above.

It should be noted that the punch unit 10 of the present invention is adaptable for a wide variety of differently configured holes 38, due to the interchangeability of the punch 22*a,b* and corresponding mandrel 18*a,b*. Connections of the punch 22*a,b* to the punch support 12, and the mandrel 18*a,b* to the mandrel support 16, are simplified by use of the retaining pins 26 and 40 respectively. The straight forward arrangement of pin 26 and cutout 68 facilitate the interchangeable aspect of the punch 22*a,b* and alignment of the punch 22*a,b* in the bores 24, 25. Correspondingly, the arrangement of key 54 and key-way 50, with retaining screw 40, facilitate the interchangeability of the mandrel 18*a,b* to correspond with that of the punch 22*a,b*. It should be noted that the number of fasteners for securing the punch 22*a,b* and the mandrel 18*a,b* in the punch unit 10 are reduced, thereby facilitating the setup and adaptability of the unit 10 for a variety of different hole geometries. The leg 50, retaining screw 40, and retaining pin 26 are situated in area of the punch unit 10 easily accessible by the operator, in order to facilitate the changing of the tool and die assembly 17.

It is recognized that the retaining screw 40, the key-way 50 and the retaining pin 26 can be situated on other areas of the punch unit 10 then what is shown, so long as they are easily accessible by the operator. Furthermore, the securing arrangements of pin 26 with cutout 68 and screw 40 with key 54 can be different than what is shown in FIGS. 1, 2, 3, so long as the arrangements provide for releaseably securing the mandrel 18*a,b* and the punch 22*a,b* in the correct position and orientation. It is also recognized that the male die member 28*a,b* can be situated on the mandrel 18*a,b* and the female die member 30*a,b* on the punch 22*a,b*.

Figure 4:
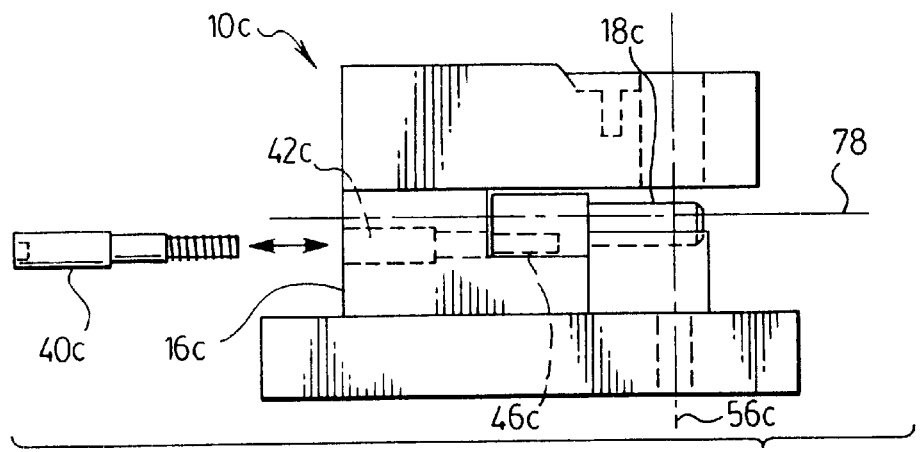
FIG. 4 is a side view of further embodiment of the unit of FIG. 1.

A further embodiment for securing the mandrel 18*a,b* is shown in FIG. 4, wherein like numerals with a suffix "c" refer to similar elements to those of FIG. 1, a retaining screw 40*c* and corresponding bores 42*c* and 46*c* are offset from an axis 78 of mandrel 18*c*. This arrangement provides for angular orientation and securement of the mandrel 18*c* with respect to the mandrel support 16*c* and vertical axis 56*c*.

Figure 5:
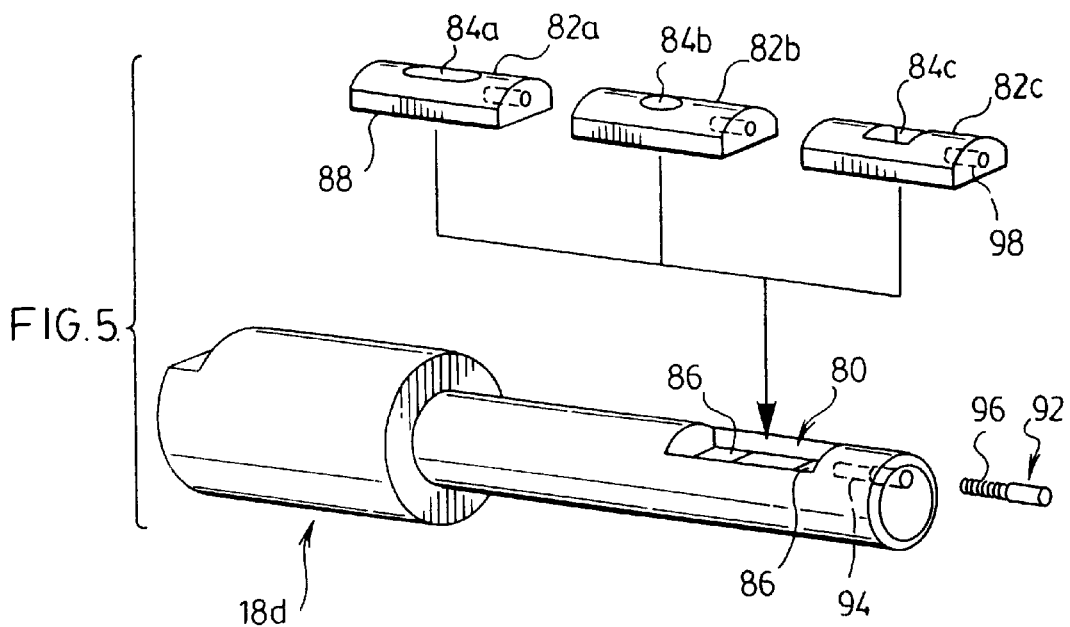
FIG. 5 is a perspective view of a further embodiment of a mandrel of FIG. 1.
Figure 6:
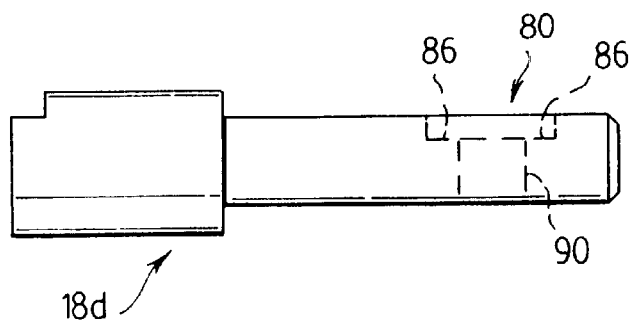
FIG. 6 is a side view of the mandrel of FIG. 5.

A further embodiment for an interchangeable mandrel 18*d* is shown in FIGS. 5 and 6, wherein like numerals with a suffix "d" refer to similar elements to those of FIG. 1. The mandrel 18*d* includes die insert 80, which is appropriately sized to receive a corresponding female die insert 82*a,b,c*. The inserts 82*a,b,c* are interchangeable with the same mandrel 18*d* and contain different hole geometries 84*a,b,c*, which are compatible with corresponding male die members (not shown). The die cavity 80 contains shoulders 86, which support portions of an underside face 88 of the inserts 82*a,b,c*. The die cavity 80 also contains an ejection passage 90 to facilitate removal of the blanks 78. In order to install or remove the inserts 82*a,b,c* with respect to the cavity 80, a retaining screw 92 is received in bore 94 in the mandrel 18*d*. The screw 92 has a threaded portion 96 which corresponds to a threaded bore 98 located on an end of the inserts 82*a,b,c*.

Use of the inserts 82a,b,c facilitates replacement of the female die member 82a,b,c as it wears out, rather than replacement of the entire mandrel 18d. It is recognized that different hole geometries and securing arrangements of the insert 82a,b,c to the mandrel 18d, other than what is shown, can be implemented without departing from the spirit and scope of the invention. It is also recognized that the male die member 28a,b can be attached to the punch 22a,b as inserts, if desired.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. An apparatus for punching an aperture of selected geometry in a wall of a component, the apparatus comprising:

a frame for supporting said component;

a tool and die assembly releaseably securable to said frame and having a punch operatively coupled to a mandrel, said tool and die assembly comprising a male die member and a female die member cooperating to form said aperture in said wall, one of said members being coupled to said mandrel and the other of said members being coupled to said punch, said mandrel being releasably securable to a portion of said frame and said punch being releasably securable to another portion of said frame such that the longitudinal axis of said mandrel is placed in a fixed position relative to the longitudinal axis of said punch once each of said mandrel and said punch is secured to said frame; wherein the male and female portions of said tool and die assembly are interchangeable as a set and aligned in a fixed position relative to one another once said mandrel and said punch are secured, the male and female portions cooperating to provide a selected one of a plurality of predetermined aperture geometries in said wall.

2. An apparatus according to claim 1, wherein a threaded fastener releaseably secures said mandrel to said frame.

3. An apparatus according to claim 2, wherein a key may be received by an aligned passageway in said frame and said mandrel to releaseably maintain said mandrel in a predetermined orientation with respect to said frame.

4. An apparatus according to claim 2, wherein said threaded fastener is connected to a bore in said mandrel, said bore in a spaced apart relationship with respect to a central axis of said mandrel for releaseably maintaining said mandrel in a predetermined orientation with respect to said frame.

5. An apparatus according to claim 1, wherein said punch is releaseably securable to said frame by a pin while allowing said punch to move in a reciprocal fashion in a bore of said frame.

6. An apparatus according to claim 5, wherein an end portion of said pin is engaged towards an elongated cutout along a portion of said punch.

7. An apparatus according to claim 6, wherein the arrangement of said pin and said elongated cutout releaseably maintains said punch in a predetermined orientation with respect to said frame.

8. An apparatus according to claim 1, wherein at least one of said die members constitutes a replaceable portion, said replaceable portion releaseably secureable to said mandrel.

9. An apparatus according to claim 1, wherein at least one of said die members constitutes a replaceable portion, said replaceable portion releaseably secureable to said punch.

10. An apparatus according to claim 1, wherein said component is a tubular member.

11. An apparatus according to claim 1, wherein said male portion of said die assembly is said punch.

12. An apparatus according to claim 1, wherein said female portion is an insert removable from said mandrel.

13. An apparatus according to claim 1, wherein said female portion of said die assembly is said mandrel.

14. An apparatus according to claim 13, wherein said female portion is an insert removable from said mandrel.

15. An apparatus according to claim 1, wherein said one of said members is said female die member.

16. An apparatus according to claim 15, wherein said female die member is an insert removable from said mandrel.

17. An apparatus according to claim 1, wherein said other one of said members is said male die member.

18. An apparatus according to claim 17, wherein said one of said members is said female die member.

19. An apparatus according to claim 18, wherein said female die member is an insert removable from said mandrel.

* * * * *